Dec. 18, 1945. S. T. FARRELL ET AL 2,391,232
BOLT
Filed March 22, 1944
*Fig.1*
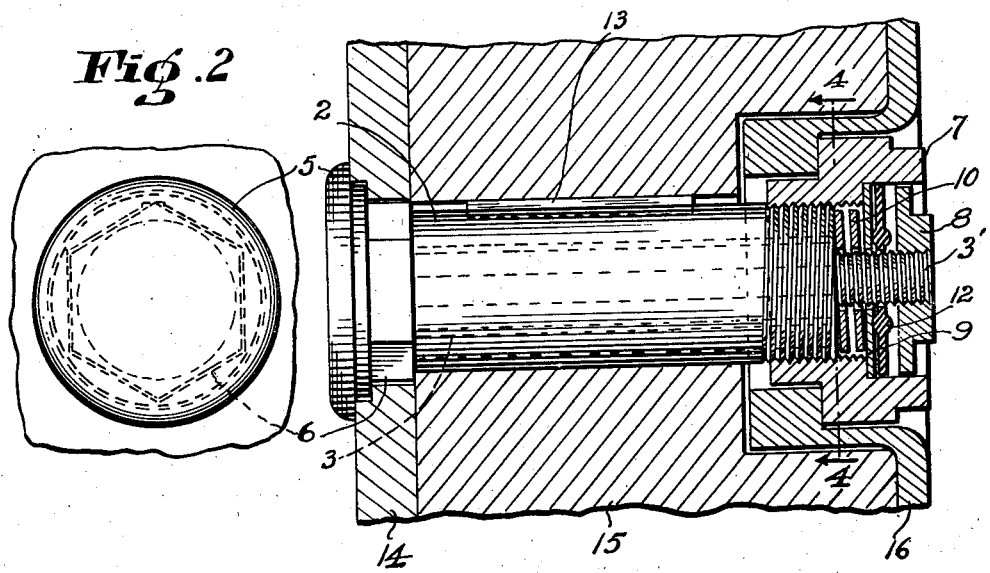
*Fig.2*
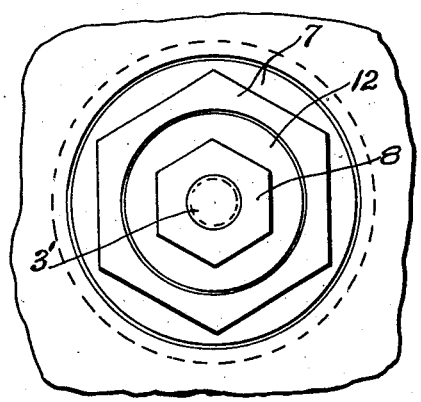
*Fig.3*
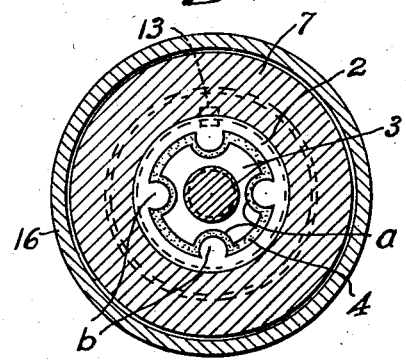
*Fig.4*
INVENTORS:
Sydney T. Farrell
and
BY Frederick L. Farrell
ATTORNEY.

Patented Dec. 18, 1945

2,391,232

UNITED STATES PATENT OFFICE 2,391,232

BOLT

Sydney T. Farrell and Frederick L. Farrell, Belmont, Mass.

Application March 22, 1944, Serial No. 527,602

6 Claims. (Cl. 151—32)

This invention relates to bolts of the larger types, such as those used in fastening machine parts together, or to a support of some kind.

It aims to devise a bolt of this character which will not only be exceptionally secure, but which also, in its preferred form, will have cushioning or shock absorbing properties. These characteristics are very desirable for special situations as, for example, where the transmission of shock and vibration to a support or to another machine part is highly objectionable. Such bolts, however, present exceptional locking problems. That is, the very fact that they absorb vibration and shock aids the tendency of any nut used with them to back off and thus to permit the bolt to loosen up. This invention deals with both difficulties, and it aims to devise a solution for both of them.

The nature of the invention will be readily understood from the following description when read in connection with the accompanying drawing, and the novel features will be particularly pointed out in the appended claims.

In the drawing:

Fig. 1 is a vertical, sectional view of a bolt constructed in accordance with this invention, some parts being shown in section, and the bolt being illustrated in an operative position;

Figs. 2 and 3 are left and right end views, respectively, of the bolt as shown in Fig. 1; and Fig. 4 is a sectional view taken substantially on the line 4—4, Fig. 1.

The bolt shown in the drawing comprises a body consisting of two sections telescoped, one within the other, and indicated, respectively, at 2 and 3. The inner section 3 is provided with several longitudinally extending grooves a, while the outer section 2 has corresponding ribs b to enter said grooves, as best shown in Fig. 4, and these two sections are held in a radially spaced relationship to each other by an intervening layer or sleeve 4 of cushioning material, such as rubber, rubber compositions, and those made of plastics having cushioning properties. These will be compounded to give them the desired degree of elasticity and hardness and for this purpose they will, in some cases at least, be reinforced by fillers of either a granular or fibrous nature. Also, for some purposes, they may consist of fabrics, either laminated or not, as circumstances may require but, in any event, they will be heavily impregnated with rubber or other compounds having the desired qualities of elasticity.

The inner section 3 is provided with a head 5 which may or may not be shouldered, as shown in Fig. 1, but which, preferably, includes an hexagonal section 6 to facilitate the support of the inner section for the assembly of the parts 2 and 4 with it.

At the end of the bolt opposite the head 5 the outer section 2 is provided with a left-hand screw thread to receive a nut 7, while the inner section has an extension 3' which is threaded in a right-hand direction to receive another nut 8. Between these nuts there is interposed a metal or other rigid washer 9 with a coiled spring 10 positioned between this washer and the end of the main body portion and another washer 12 of yielding or elastic material between the washer 9 and the nut 8. In Fig. 1 the spring 10 is shown compressed as it would be when the nut 8 is tightened up, but the latter is shown somewhat spaced from the washer 12, or, in other words, is not turned up tightly. Preferably the outer member 2 of the body is grooved to receive a key 13 that holds this part of the bolt from turning.

It will be observed that in this construction when the nut 8 is turned up tightly and the entire assembly is subjected to vibration and shock tending to make either of the nuts back off, any such movement of one nut is transmitted through the washers 9 and 12 to the other nut, and because they are oppositely threaded, any backing-up movement of one tends to tighten the other. For example, if the nut 7 backs up ever so slightly, that movement will be toward the right and against the resistance offered by the frictional connection between the two nuts. Such backing-up movement, therefore, will be transmitted to the nut 8 in a direction to tighten that nut on the screw 3'. The same result will be produced if the nut 8 tends to back off in a left-hand direction. This movement will be transmitted through the parts 9 and 12 to the nut 7 tending to tighten it on the body member 2.

Thus any backing off of either nut tends to bind the other more tightly in place, with the result that there is substantially no danger of the bolt becoming loosened. The spring 10 is useful in backing up the central portion of the washer and increasing the resistance applied to any turning movement of the nut 8. It is, however, not always necessary.

In the arrangement shown in Fig. 1, the bolt clamps together three members 14, 15 and 16 and the two latter members are recessed so that the outer surface of the nut end of the bolt is substantially flush with the outer face of the part 16. Consequently, the nut 7 and the recessed portion of the member 16 have been designed particularly for a situation of this kind, but it is obvious that this particular form of nut would not be required under the circumstances more commonly met.

While, therefore, we have herein shown and described a typical embodiment of our invention, it will be evident that it may be embodied in other forms without departing from the spirit or scope thereof. For example, it will sometimes be found advantageous to make the washer 9 and the nut 7 integral, or to weld these two parts together so that functionally they are integral. Such a construction increases the frictional resistance, other things being equal, that must be overcome in turning either of the nuts 7 or 8 relatively to the other.

Having thus described our invention, what we desire to claim as new is:

1. A bolt of the character described, comprising two sections telescoped, one within the other, cushioning material interposed between said sections and substantially isolating one section radially from the other, said sections having adjacent end portions which are oppositely screw-threaded, right and left-hand nuts threaded on said respective screw-threaded portions and friction means connecting said nuts and operable to transmit any backing-off movement of one to the other and thereby producing a tightening action on the latter.

2. A bolt according to preceding claim 1, in which said inner bolt section carries a head against which one end of the other section bears, and one of said nuts radially overlaps the other nut.

3. A bolt of the character described, comprising two sections telescoped, one within the other, cushioning material interposed between said sections and substantially isolating one section radially from the other, said sections having adjacent end portions which are oppositely screw-threaded, right and left-hand nuts threaded on said respective screw-threaded portions, the nut on said inner section being radially overlapped upon the other nut, and resilient cushioning means interposed between the two nuts, whereby the outer section of said bolt and its nut are cushioned both radially and axially with reference to the inner section.

4. A bolt of the character described, comprising two sections telescoped, one within the other, cushioning material interposed between said sections and substantially isolating one section radially from the other, said sections having adjacent end portions which are oppositely screw-threaded, right and left-hand nuts threaded on said respective screw-threaded portions, the bore of said outer section and the outer surface of said inner section being complementally grooved and ribbed, and said cushioning material filling the greater part of the space between said grooved and ribbed surfaces, whereby it cushions both relative radial movement of one section on the other and also a turning movement of either section relatively to the other around the common axis of the two sections, said nuts being so associated with each other as to transmit any backing-off movement of one to the other, and thereby tending to tighten the latter.

5. A bolt of the character described, comprising two sections telescoped, one within the other, cushioning material interposed between said sections and substantially isolating one section radially from the other, said sections having adjacent oppositely threaded end portions, nuts threaded on said end portions, and cushioning means providing broad friction surfaces disposed transversely to the axis of the bolt and connecting said nuts, whereby each exerts a restraining action on the other tending to prevent it from backing off.

6. A bolt according to preceding claim 5, in which bolt of said cushioning means are enclosed within the bolt structure.

SYDNEY T. FARRELL.
FREDERICK L. FARRELL.